United States Patent
Freunek (10) Patent No.: US 11,354,457 B2
(45) Date of Patent: Jun. 7, 2022

(54) METHOD FOR STRUCTURING AN EXISTING GRID FOR DISTRIBUTING ELECTRIC ENERGY

(71) Applicant: BKW Energie AG, Bern (CH)

(72) Inventor: Monika Freunek, Gasel (CH)

(73) Assignee: BKW ENERGIE AG, Bern (CH)

( * ) Notice: Subject to any disclaimer, the term of this patent is extended or adjusted under 35 U.S.C. 154(b) by 457 days.

(21) Appl. No.: 16/472,540

(22) PCT Filed: Dec. 8, 2017

(86) PCT No.: PCT/EP2017/082059
§ 371 (c)(1),
(2) Date: Jun. 21, 2019

(87) PCT Pub. No.: WO2018/114404
PCT Pub. Date: Jun. 28, 2018

(65) Prior Publication Data
US 2020/0151371 A1    May 14, 2020

(30) Foreign Application Priority Data
Dec. 23, 2016   (CH) ...................... 1725/16

(51) Int. Cl.
*G06F 30/18* (2020.01)
*H02J 3/00* (2006.01)
*G06Q 50/06* (2012.01)

(52) U.S. Cl.
CPC ............ *G06F 30/18* (2020.01); *G06Q 50/06* (2013.01); *H02J 3/001* (2020.01)

(58) Field of Classification Search
CPC .. G06F 30/18; G06F 2111/04; G06F 2111/06; G06Q 50/06; G06Q 10/0631;
(Continued)

(56) References Cited

U.S. PATENT DOCUMENTS

| 9,876,356 B2 * | 1/2018 | Sun ......................... H02J 3/241 |
| 2005/0178432 A1 * | 8/2005 | Porter ................. H01M 16/003 137/14 |

(Continued)

FOREIGN PATENT DOCUMENTS

| DE | 10 2012 101 799 A1 | 9/2013 |
| EP | 2 533 396 A2 | 12/2012 |

(Continued)

OTHER PUBLICATIONS

Meyers, "GIS in the utilities", Geographical Information Systems: Management Issues and Applications, Feb. 2, 1999, pp. 801-818.
(Continued)

*Primary Examiner* — Ziaul Karim
(74) *Attorney, Agent, or Firm* — Birch, Stewart, Kolasch & Birch, LLP (57) ABSTRACT

In a method for structuring an existing grid (11) for distributing electric energy, wherein the grid (11) comprises, as grid components, at least sources, loads, lines, sensor, switching and converter components which are connected to one another in a starting topology, on the basis of property variables of the grid components and predefinable regulation limits, the grid components are combined in a plurality of local, self-regulating functional groups (30.1, 30.2, 30.3). Each local functional group (30.1, 30.2, 30.3) is assigned regulation processes comprising actions which are carried out upon reaching trigger criteria for complying with the regulation limits. Starting from an existing grid for distributing electric energy, the method results in a grid which is newly structured in terms of the regulation and, as far as possible, dispenses with a hierarchical structure with respect to the regulation and instead is constructed from local functional groups (30.1, 30.2, 30.3) which are self-regulating during normal operation. This reduces the susceptibility (Continued)

to faults and thereby increases the operational safety and supply reliability, inter alia.

17 Claims, 4 Drawing Sheets

(58) Field of Classification Search
CPC .......... H02J 3/001; H02J 2203/20; H02J 3/38; H02J 3/00; Y02E 60/00; Y04S 40/20
See application file for complete search history.

(56) References Cited

U.S. PATENT DOCUMENTS

| | | |
|---|---|---|
| 2007/0055636 A1 | 3/2007 | Chambers et al. |
| 2007/0159866 A1* | 7/2007 | Siri .................... H02M 7/53803 363/95 |
| 2011/0106321 A1* | 5/2011 | Cherian ............ H02J 13/00017 700/286 |
| 2013/0231094 A1* | 9/2013 | Bacila ................ H04L 12/1804 455/414.1 |
| 2013/0232094 A1 | 9/2013 | Anderson |
| 2014/0018969 A1* | 1/2014 | Forbes, Jr. .............. H02J 3/386 700/295 |
| 2014/0368032 A1 | 12/2014 | Doerndorfer |
| 2015/0058061 A1* | 2/2015 | Salama ............ G06Q 10/06312 705/7.22 |
| 2015/0286973 A1 | 10/2015 | Becher et al. |
| 2016/0315473 A1 | 10/2016 | Lebel et al. |
| 2016/0361041 A1* | 12/2016 | Barsimantov ............ A61B 7/00 |

FOREIGN PATENT DOCUMENTS

| | | |
|---|---|---|
| JP | 11-146560 A | 5/1999 |
| JP | 2013-538543 A | 10/2013 |
| JP | 2016-77138 A | 5/2016 |
| WO | WO 2012/008979 A2 | 1/2012 |
| WO | WO 2012/008979 A3 | 1/2012 |
| WO | WO 2014/079605 A1 | 5/2014 |
| WO | WO 2015/121937 A1 | 8/2015 |

OTHER PUBLICATIONS

Nordman et al., "An Agent Concept for Managing Electrical Distribution Networks", IEEE Transactions on Power Delivery, vol. 20, No. 2, Apr. 2005, pp. 696-703.

* cited by examiner

METHOD FOR STRUCTURING AN EXISTING GRID FOR DISTRIBUTING ELECTRIC ENERGY

TECHNICAL FIELD

The invention relates to a method for structuring an existing grid for distributing electric energy, wherein the grid comprises, as grid components, at least sources, loads, lines, sensor, switching and converter components which are connected to one another in a starting topology. The invention also relates to a method for operating a grid structured according to the structuring method for distributing electric energy.

PRIOR ART

Grids for distributing electric energy (power grids) comprise a network of electric lines (namely overhead lines and underground cables) and further grid components which are connected to one another using the lines in a particular topology. The further grid components comprise sources, for example the generators of power plants, or intermediate stores, for example batteries, loads (consumers), sensor components for capturing operating parameters of the grid (voltages, frequency, currents, powers, temperatures etc.), switching components for connecting and disconnecting components or grid sections and converter components, for example transformers, for example for changing the voltage.

The topology is subdivided into a plurality of grid levels. Starting from a producer such as a power plant, the long-range distribution is first of all carried out via a transmission grid having an extra-high voltage (for example 380 or 220 kV). Substations with transformers are used to connect national distribution grids having a high voltage (for example 36-150 kV), to which regional distribution grids having a medium voltage (for example 1-36 kV) are in turn connected via further transformers. The local distribution grid having a low voltage (for example 400 V-1 kV) is then connected via further transformers and leads (possibly via transformer stations) to the home connections and therefore to the end consumer (inter alia private households, industrial plants, commercial enterprises and farms).

The specific topology having the components present in the grid has grown historically depending on the locations and powers of the producers (power plants) and of the consumers. Changes to the topology generally require additional electric lines or electric lines which run or are dimensioned differently and are therefore costly.

In recent years, the demands imposed on the power grid have changed, in particular on account of the emergence of local producers, for example photovoltaic installations. It is no longer used merely to hierarchically distribute electric energy "from the top" (that is to say from the power plant) "to the bottom" (that is to say to the consumers), but rather the current flows may be different depending on production conditions (for example solar radiation) and consumption patterns.

The control or regulation of the grid, which is aimed at safe operation and is namely intended to ensure that pre-defined regulation limits (for example with respect to frequency, voltage, current) are complied with, is generally still hierarchically organized, which means that the requirements have increased greatly and more frequent interventions are needed to maintain operational safety.

In order to gain further information, in particular at the consumer end, which can be included in the control or regulation, use is nowadays being increasingly made of so-called "smart meters" which directly capture information, namely consumption information, from the consumers and transmit said information to superordinate devices of the grid, for example a control center, via a communication network.

A large volume of data thus arises at this superordinate point and must be processed within a short period. The choice of the measures to be taken in the subordinate grid section is complex and there is a risk of operational faults in the event of errors in the transmission of the measurement signals from the smart meters (and other sensor components) to the superordinate point or of the control signals back to the components in the grid.

The addition of additional components (for example relatively large photovoltaic or wind installations or cogeneration plants) can decisively change the behavior of a grid section, which requires comprehensive adaptations to the control and regulation processes which are complex anyway. There are physical limits on account of the latencies in the transmission of data from the components to the superordinate point, which concerns the regulability in the case of short-term events. Relatively large reserves (for example with respect to the line cross section) must therefore be available. This in turn restricts the transmission capacity which can be provided without complicated retrofitting.

EP 2 533 396 A2 (Alstom Grid) deals with some of the problems mentioned above. It relates to intelligent electric distribution grids and proposes a control system extending over a plurality of levels for the distribution grid. This may provide, inter alia, for each level of the control system to function as a control loop, for redundant topographical network structures to be provided, or for the data processing and the control to be distributed over the levels of the control system. Said document likewise proposes moving control and data aspects to higher or lower levels and providing rule-based processes which increase the degree of autonomy of the levels. Specifically, a top-level distribution network node controller (DNNC) is proposed and, in a hierarchical topology, interacts with DNNC components on lower levels. A DNNC component on a lower level can receive the signals from a smart meter, for example, and can therefore monitor the energy consumption of a business customer. The top-level DNNC can specify, for example, that it is intended to be notified by the DNNC component on the lower level only when this energy consumption differs by more than 10% from the historical consumption. The data traffic can therefore be reduced. For example, the top-level DNNC can instruct the DNNC component on the lower level to switch off further components in order to prevent an overload or the like.

Said document is based substantially on the hierarchical structure of the grid nodes, which is known per se, with the associated known disadvantages. It describes a target state and does not disclose a systematic approach to arriving at this target state from an existing distribution grid.

WO 2014/079605 A1 (Siemens Aktiengesellschaft) relates to a multimodal grid, that is to say a grid consisting of a plurality of subgrids which distribute different resources in the form of fossil fuel, electric energy, water, heat and cold using resource distribution units. Said document also relates to a method for distributing resources in a multimodal grid. It is proposed to integrate conversion units in the subgrids, which conversion units convert resources of one or more subgrids into one or more other resources of one or more other subgrids. Resource processing units are also present and are each assigned at least one agent, wherein the agents are networked to one another in such a manner that each agent can communicate with other agents in the grid. The resources in the grid are at least partially distributed on the basis of monetary transactions negotiated between the agents. As a result, the intention is to achieve decentrally regulated, self-organizing distribution of different resources in the multimodal grid.

A distribution of resources based on monetary transactions may be useful in a multimodal grid. However, if a plurality of grids which are based on different resources are not linked or if the degree of networking between subgrids is relatively low, decentralized, robust control of a grid for distributing electric energy cannot be achieved in the proposed manner.

US 2015/0058061 A1 (Salama et al.) relates to a method for energy management in and the optimization of smart grids, wherein the available local means and resources are managed in such a manner that the aims of a decision-maker are achieved. For this purpose, the power in a specific segment is monitored and regulated, in which case the characteristic properties of the segment are taken into account. The behavior of a monitored system is predicted for a particular period of time and, on the basis of this, a certain energy flow which accomplishes the aims mentioned (for example the minimization of greenhouse gases, energy costs, energy losses, installation costs for additional components or the maximization of the power quality) is then proposed.

The proposed system assumes that the processes taking place can be predicted. This requires complicated modeling, and so the process of setting up and continuously updating the system is associated with high costs.

DESCRIPTION OF THE INVENTION

The object of the invention is to provide a method for structuring an existing grid for distributing electric energy, which method belongs to the technical field mentioned at the outset and can be systematically applied to the existing grid and enables a high degree of operational safety with a low susceptibility to faults.

The achievement of the object is defined by the features of claim 1. According to the invention, on the basis of property variables of the grid components and predefinable regulation limits,
a) the grid components are combined in a plurality of local, self-regulating functional groups, and
b) each local functional group is assigned regulation processes comprising actions which are carried out upon reaching trigger criteria for complying with the regulation limits.

The method according to the invention is therefore used to combine an existing grid for distributing electric energy in local functional groups with regard to the regulation of said grid and to assign regulation processes to said functional groups. The result of the method therefore comprises setting up the functional groups with the respective grid components and setting up the regulation processes with their assignment to the functional groups. The result may comprise further information, as stated further below.

An "existing grid" may be a section of a larger grid. In principle, the user can stipulate the field of application of the method, that is to say which grid components are actually intended to be taken into account.

A "source" in the sense of the method according to the invention may be a generator, a (current-releasing) battery or another energy store or simply an "input" of the grid or grid section under consideration. "Loads" in the sense of the method are consumers, batteries or other energy stores in the charging mode or simply an "output" of the grid or grid section under consideration.

Depending on the operating state of the grid, certain grid components may occasionally constitute sources or loads. There are likewise grid components which combine a plurality of functions (for example load and sensor component, source and converter components etc.).

Said property variables are, for example, cable diameters and line lengths, transformer powers or short-circuit currents. The regulation limits correspond, in particular, to desired operating ranges, wherein, in order to ensure operation in the desired operating range, the value of a regulation limit relating to the same variable as the desired operating range need not necessarily be identical to the limit of the desired operating range. In order to ensure a sufficiently early reaction, the regulation limit can already be reached, for example, before the desired operating range is left.

A local functional group in the sense of the method according to the invention is formed by components connected to one another according to a topology, wherein, in the extreme situation, an individual grid component can also form a functional group. In this context, "local" does not necessarily mean that all components in a functional group must be within a particular spatial area. If the latency of the transmission of information and the distance over which information has to be transmitted are taken into account when combining grid components to form functional groups, this should generally result in all local functional groups being restricted to relatively small geographical areas in each case. A functional group will generally comprise no "holes" and no areas isolated from the remainder of the included grid components. The topology, according to which the components in the local functional group are connected, is the starting topology, in particular. If the method proposes changes to the topology, this may also be a result topology which differs from the starting topology.

Functional groups may, in principle, be interleaved in one another, wherein an inner functional group can be considered to be a grid component in the outer functional group.

The local functional groups regulate themselves during normal operation. If the trigger criteria are reached, measures outside the respective functional group can be initiated by respective actions of the regulation processes. The regulation processes may provide further actions which act only inside functional groups. In principle, the term "regulation process" denotes both interventions in the operation of grid components and the transmission of particular information from one grid component to certain other grid components (in the same functional group, in another functional group or at a superordinate or coordinate point).

In its simplest form, a trigger criterion is formed by a predefined value of a variable and by a statement indicating whether the criterion is met when the value of an input variable (for example a measurement variable) is exceeded or undershot. However, a trigger criterion may also be defined by a statement of a range or may be based on a more complex function which also includes, in particular, logical (Boolean) operators. A trigger criterion may relate to an instantaneous value of the input variable or of a plurality of input variables, or a certain past interval of time is taken into account. Trigger criteria may also be dependent not only on the variables assigned to the respective regulation limit but also on a change rate of such variables (that is to say the time derivative). A fast increase or a fast decrease in a variable can therefore already indicate that there is a need for action before the regulation limits are reached.

The combination in local functional groups according to step a) and the assignment of regulation processes according to step b) need not necessarily take place in the order a)-b). In particular, the steps can be iteratively carried out within the scope of the method according to the invention, for example if it is determined during step b) that a combination in a functional group, as provided according to the preceding step a), leads to problems with complying with the regulation limits.

Starting from an existing grid for distributing electric energy, the method according to the invention results in a grid which is newly structured in terms of the regulation and, as far as possible, dispenses with a hierarchical structure with respect to the regulation and instead is constructed from local functional groups which are self-regulating during normal operation. Since the functional groups of the structured grid operate in an autonomous manner as far as possible and information needs to be transmitted over further distances only when trigger criteria are reached and corresponding actions are initiated or when further information is gathered in a functional group and is (also) required in other functional groups as standard, the transmitted volume of data is minimized. Only that information which is needed for operation is also gathered. There is no need to additionally gather and transmit comprehensive information for prediction purposes.

On account of the reduced transmitted volume of data and the lower dependence of each functional group on data outside the group, the grid is more difficult to attack, and the risk of problems on account of disruptions in the transmission of information is reduced. The energy requirement for managing the grid is also reduced.

Problems on account of latencies in the transmission of data are also minimized as a result of the local regulation. This likewise increases the operational safety and supply reliability.

Specifying regulation limits and trigger criteria coupled thereto ensures that, if there is the risk of a problem, there is always an immediate reaction starting from that point in the grid at which the problem is manifested. This also increases the operational safety and ensures the grid quality.

Since the method according to the invention is based on the existing grid and its known parameters, it is immediately clear which sensors, actuators and intelligence must be retrofitted or activated and where and which costs are associated with this. For the user, it is also systematically clarified, inter alia, whether and where the use of the local functional groups pays off and the extent to which the adaptations are usefully implemented.

Additional infrastructure components and unnecessary transmission of information can be avoided provided that this is compatible with the compliance with the regulation limits (and possibly further predefined criteria).

The method according to the invention can be fundamentally applied to static and dynamic optimization. Determining the autonomous regulation operation may also facilitate the dynamic purchase of energy because particular uncertainties are reduced by specifying the regulation limits (for example permitted powers).

The method can be used to systematically continuously automate substantially the entire grid and to operate it in an energy-efficient manner by the division into the self-regulating functional groups.

In a method for operating the grid structured according to the inventive method for distributing electric energy, sensor components in the local functional groups are used to monitor whether trigger criteria are reached; one of the actions assigned to the respective functional group for complying with the regulation limits is carried out upon reaching a trigger criterion.

In principle, during operation, the present structuring of the grid in local functional groups can be periodically or continuously checked. It is therefore immediately recognized whether a change to the division into functional groups and/or an adaptation of the regulation processes would be useful on account of changed boundary conditions. Such a change can then be implemented at a suitable time.

Within the scope of the method according to the invention for structuring the grid, a potential local functional group is advantageously defined. A check is then carried out in order to determine whether the potential local functional group can be locally regulated while complying with the predefinable regulation limits. The potential local functional group is accepted if it is determined that there is local regulability. The potential local functional group is expanded with further grid components if local regulability is absent.

The check for local regulability can be carried out on the basis of a simulation, for example. It is alternatively or additionally also possible to carry out a comparison with stored patterns, wherein the patterns represent, in particular, frequent combinations of a plurality of components with certain properties. Various criteria are possible for local regulability; local regulability is preferably assumed if the expected frequency of non-local intervention undershoots a particular threshold value. This threshold value can be selected differently depending on the grid level, size of the potential local functional group, availability of the non-local interventions and/or other influencing factors.

The expansion is advantageously carried out with further grid components which are already available in the grid. These may be grid components which are not yet allocated to a local functional group, or a plurality of functional groups are merged. If an expansion with existing components is not possible, additional components are proposed, in which case a proposal for the type and specifications of the respective component and for its best possible positioning in the grid is advantageously made.

Other methods can be used for the combination in local functional groups. Instead of defining a potential functional group and then checking for regulability, an entire section of the existing grid can be divided into a plurality of functional groups for test purposes, after which the division is optimized by means of a suitable method. Such methods include, in particular, evolutionary algorithms or MCMC (Markov Chain Monte Carlo) algorithms. In principle, it is also possible to use machine-learning methods, namely for recognizing patterns or applying knowledge from manual structuring of one grid section to other sections.

The actions preferably comprise local actions, which influence operation of the components in the respective local functional group, and non-local actions, which comprise a transmission of data to another local functional group or to a cross-functional-group control center. Non-local actions can in turn be divided into two classes, namely:
a) actions which substantially forward only a regulation requirement to a predefined point outside the local functional group; this point is then responsible for covering the regulation requirement of the local functional group with adequate measures; the point may be a component in another local functional group or the cross-functional-group control center mentioned; and b) actions which trigger a predefined measure at a predefined point outside the local functional group.

If actions of type b) are defined, it should be ensured that the affected other local functional group is not destabilized thereby since, in the extreme case, this could trigger a cascade ("domino effect"), via which a fault propagates to further areas of the grid.

Non-local actions for transmitting data to another local functional group or to the cross-functional-group control center can be gradually triggered. For example, data can first of all be transmitted to the other functional group. If this does not result in compliance with the corresponding regulation limit within a predefined interval of time, a transmission to the cross-functional-group control center follows. An additional safety level is thus created and it is simultaneously ensured that the grid is always regulated as locally as possible and the control center is used only if actually necessary.

A need for additional grid components for creating additional local functional groups and/or for ensuring the predefinable regulation limits is advantageously determined.

Greater decentralization of the grid can be achieved with the aid of additional local functional groups. The additional grid components include, in particular, sensors and actuators. The sensors are needed, in particular, to adequately monitor the compliance with the regulation limits in the respective local functional group. Actuators are needed, in particular, to implement the necessary measures within the scope of the actions of the respective local functional group. Furthermore, generators, memories, converter components, lines etc. can also be proposed for addition. The determination also includes, in particular, more specific details of the properties of the components and their placement.

Alternatively, the method is based only on the components available in the grid and forms only those local functional groups which are possible with these components while complying with the predefined boundary conditions. As stated further below, different expansion options can be assessed within the scope of the method, in particular by concomitantly including criteria such as costs of the additional grid components or transmitted volumes of data during numerical optimization.

In one preferred variant of the method according to the invention, a target topology is determined on the basis of the starting topology. This means that possible changes to the topology are taken into account within the scope of the method. If advantages arise as a result of a change to the topology (that is to say ultimately the connection of the existing and possibly future components), for example with respect to the grid reliability or the operating costs, a change to the topology is proposed. This is implemented by changing the connection, possibly by adding additional lines, switching and converter units.

Alternatively, the starting topology is considered to be a fixed boundary condition and the topology is therefore not changed within the scope of the method. In this case, the necessary components for maximum autonomous operation, for example, can be determined on the basis of the starting topology. It would be determined how many local functional groups can be stipulated and which sensors and actuators would need to be retrofitted. At the same time, the expenditure for adapting the grid infrastructure would be minimized.

The predefinable regulation limits advantageously comprise maximum latencies for transmitting data between local functional groups and/or different grid components. Complying with maximum latencies ensures that the regulation limits are complied with again within the necessary period. Regulation of the grid which is as local as possible is also favored.

The method advantageously comprises numerical optimization of a target function for combining the grid components in the local functional groups. The benefit and cost factors associated with different types of combination can be systematically taken into account in the target function. Known methods, for example a downhill simplex or a Newton or a Gauss-Newton method, can be used for the numerical optimization.

Different factors can be taken into account within the scope of the target function, with the result that a combination in local functional groups which accomplishes certain aims in the best possible manner is favored:

a) the target function may thus be dependent on a volume of data transmitted between grid components for regulating the grid, wherein the numerical optimization favors minimization of this volume of data (taking into account other criteria, for example the grid reliability): on the one hand, this provides a grid which is regulated as locally as possible and, on the other hand, reduces the transmitted volume of data at a predefined error rate to a smaller absolute number of errors;

b) the target function may be dependent on costs of the additional grid components, wherein the numerical optimization favors minimization of these costs (taking into account other criteria, for example the grid reliability);

c) the target function may be dependent on costs of an adaptation between a starting topology and a target topology, wherein the numerical optimization favors minimization of these costs (taking into account other criteria);

d) the target function may be dependent on local prices for the local functional groups (nodal pricing), wherein the numerical optimization favors minimization of these costs.

The existing grid advantageously comprises at least components in two adjacent levels of the following grid levels:

a) extra-high voltage grid;
b) high-voltage grid;
c) medium-voltage grid; and
d) low-voltage grid.

A grid section comprising more than a single grid level is therefore structured. This results in a higher degree of flexibility in the division into local functional groups. Both local functional groups which comprise components only from one grid level and those functional groups which comprise components from two or even more grid levels can generally be generated in the same grid. However, in principle, a method according to the invention can also be carried out in a grid section which extends only in one grid level.

In one preferred variant of the method, the property variables of the grid components and/or the starting topology is/are received from a geographical information system (GIS). The information relating to the grid section under consideration, which is needed for the structuring, can therefore be obtained in a simple manner and with the best possible up-to-dateness. Furthermore, the method can be regularly applied to the grid section based on a continuously updated GIS, with the result that continuous structuring adapted to the local conditions is obtained.

Within the scope of the method for operating a grid structured according to the invention, a maintenance requirement is preferably detected and maintenance services are automatically requested. A maintenance requirement is detected, for example, on the basis of an increased frequency with which regulation limits are exceeded or an increased call of non-local actions. Maintenance services can be automatically requested using common communication channels (for example email) or an integrated software environment (for example SAP® ERP).

Automatic ordering processes are preferably initiated via a logistics interface. This can be carried out both when structuring the grid (for example in the event of a requirement for additional components) and during subsequent operation of the grid (for example as part of the maintenance or in the event of changed boundary conditions).

If a grid-based GIS is incorporated, the topology, the combination in functional groups and the existing components can be continuously checked and optimized. According to the desired optimization, required components, for example actuators, can be continuously retrofitted by means of the logistics interface. In addition to autonomous operation, this procedure also enables the independent maintenance of the grid.

The methods according to the invention for structuring and operating the grid are carried out, in particular, with the aid of a computer program on a suitable computer.

Further advantageous embodiments and combinations of features of the invention emerge from the following detailed description and all of the patent claims.

BRIEF DESCRIPTION OF THE DRAWINGS

The drawings used to explain the exemplary embodiment show in.

In principle, identical parts in the figures are provided with identical reference signs.

WAYS OF IMPLEMENTING THE INVENTION

Figure 1:
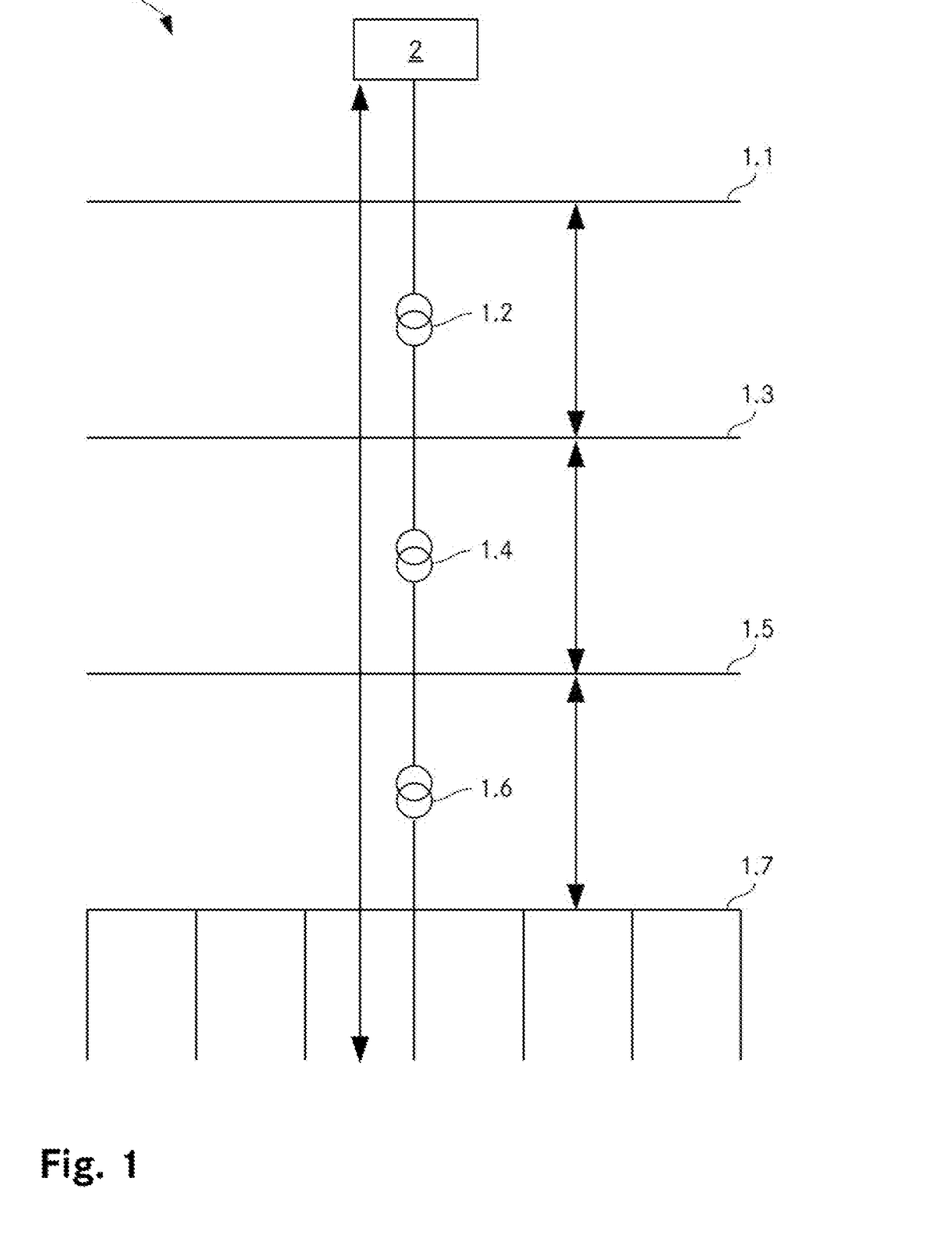
FIG. 1 a schematic illustration of an existing distribution grid for electric energy with central control.

FIG. 1 is a schematic illustration of an existing grid for distributing electric energy with central control. The grid 1 is subdivided into a plurality of grid levels 1.1 ... 1.7. In the grid levels 1.1, 1.3, 1.5, 1.7, which correspond to transmission or distribution grids, the voltage decreases from the top to the bottom:

grid level 1.1: extra-high voltage grid (for example 380 or 220 kV);
grid level 1.3: high-voltage grid (for example 36-150 kV);
grid level 1.5: medium-voltage grid (for example 1-36 kV); and
grid level 1.7: low-voltage grid (for example 400 V-1 kV).

Voltage converters (transformers) are respectively arranged in between as grid levels 1.2, 1.4, 1.6. Conventional power plants feed electric power into the grid levels 1.1, 1.3, 1.5 and the end consumers are generally connected to the low-voltage grid in grid level 1.7.

The grid 1 comprises a control center 2 which centrally performs management tasks for the grid. For this purpose, information is transmitted across all grid levels 1.1 ... 1.7 between the control center 2 and components in the grid levels 1.1 ... 1.7. Namely, measurement data are transmitted from measuring points to the control center 2 and control data are transmitted from the control center 2 to individual components of the grid. In addition, communication takes place between adjacent transmission or distribution grid levels 1.1, 1.3, 1.5, 1.7 and between the transmission or distribution grid levels and directly adjacent voltage converters in the grid levels 1.2, 1.4, 1.6.

Figure 2:
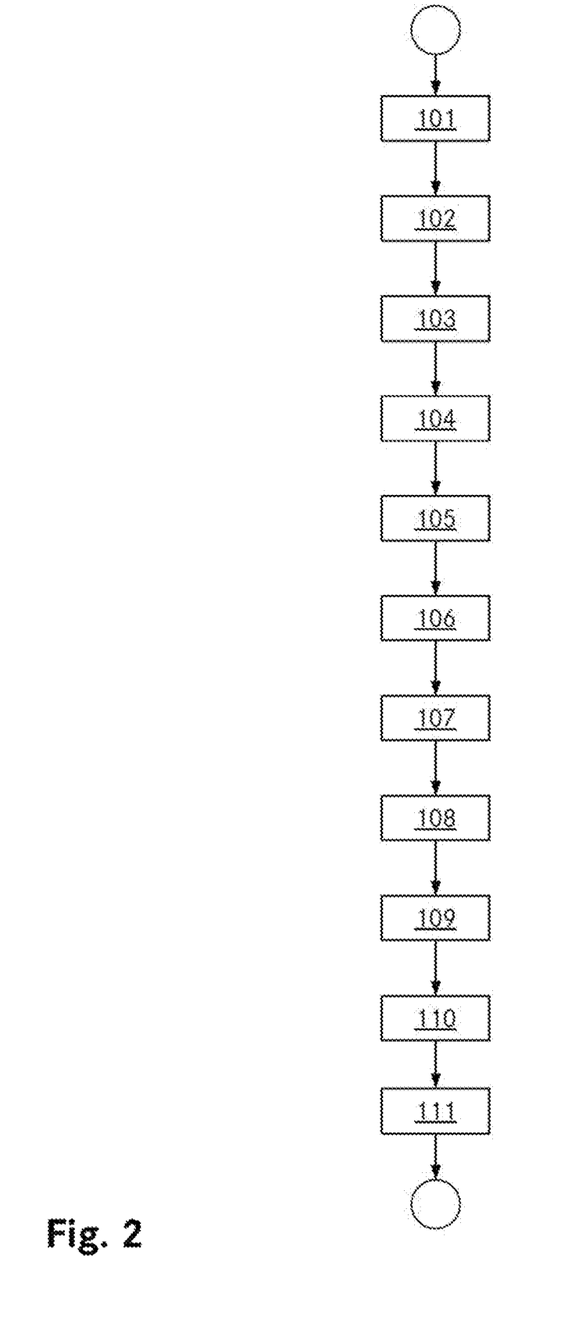
FIG. 2 a flowchart of a method according to the invention.

The sequence of a method according to the invention for structuring an existing grid for electric energy is described below. The corresponding flowchart is illustrated in FIG. 2.

It is first of all necessary to define which system is under consideration (step 101). For example, information relating to the existing grid is obtained from a grid-based geographical information system (GIS). Optionally or additionally, data are read from a database or are manually added. The components under consideration are selected in a manner known per se using a graphical user interface, for example by marking those parts of the grid which are to be structured. It is also possible to define the system via the grid level, for instance by a restriction to particular grid levels, or on the basis of other technical properties. For example, that entire section of the grid which is operated by a particular grid operator can be structured. However, cross-grid-operator structuring and the structuring of a section of the grid are also readily possible.

A second step 102 determines which variables in the system can be regulated. This information also arises from the GIS, from other databases and/or manual inputs. Those variables which should also actually be regulated during the structuring are then selected from these regulable variables (step 103). In principle, a few, a larger number or else all variables which can actually be regulated can be selected.

Classes are also defined (or adopted from an already existing class library) (step 104). Each class represents a grid section (that is to say a contiguous area of the grid with associated grid components) which has particular properties with respect to measurement variables and measurement range and possibly regulability. In this case, it should be noted that a class can possibly also represent only a single grid component.

The grid section under consideration can then be represented by a selection of entities in the existing classes which are connected in a starting topology. If this is initially not possible when using existing classes from a class library, it is possible to define additional classes. However, it is not compulsory for the entire grid to be represented using entities in defined classes. In this case, components and grid sections which have not been represented would be conventionally regulated and would not be autonomously operated or combined to form autonomously operated functional groups.

For all classes (or all classes, from which at least one entity is available in the grid), the desired ranges of the variables to be regulated are then stipulated; in principle, this information can also be automatically taken from a library. Particular classes or combinations of classes may have already been identified by this time as autonomously acting functional groups on the basis of predefined criteria (for example with respect to the expected frequency of an external regulation requirement).

The desired operation of the regulation variables defines the rules, possible actions and the necessary information in order to be able to check whether the trigger criteria for the actions have been met. The limits which should be complied with in terms of the operating parameters during desired operation are determined in step 105 a) by the grid operator;
b) by specifications in the software; and/or c) in the case of a GIS-based grid information system in which the component is stored with the operating data: automatically by means of software. The knowledge of the actually available (maximum) power or other dynamic parameters is not necessary as a result of the knowledge of the component and its known or calculable maximum load.

In order to define the limits, there is an orientation to existing components and/or to standards (for instance maximum permissible current for a cable) or for instance—in the case of a new construction—to the connections and a requested maximum power.

The following table lists, for example, parameters for the desired operation in a local distribution grid. The action listed in the left-hand column is respectively carried out if the operating range is not complied with, that is to say a corresponding trigger criterion is satisfied:

| Unit | Parameter | Lower operating range | Upper operating range | Action |
|---|---|---|---|---|
| PV meter with control output and interrupter | Frequency | 49.5 Hz | 50.5 Hz | Reduce $P_{active}$, disconnect from the grid above 52 Hz |
| PV meter with control output and interrupter | Voltage | 207 V | 253 V | Obtain reactive power, reduce power if this does not suffice |
| PV meter with control output and interrupter | Current | 0 A | 100 A | Disconnect from the grid/change tariff/send message |
| PV meter with control output and interrupter | Harmonic | 0 | 20 | Store number of times the value is exceeded; if more than 10, send message to grid operator/connect short-circuit current amplifier or filter/contact customer and change tariff |

| Unit | Parameter | Lower operating range | Upper operating range | Rule | Action |
|---|---|---|---|---|---|
| Meter with customer having a moderate, temporally limited load limit | Voltage, current | EN 50160 0 | EN 50160 x | Action when the time information is received | Reduce voltage to the lowest value according to EN50160 if the load limit is exceeded |
| Meter with customer having a load limit | Current | 0 | x | Comply with upper operating range | Limit current to the upper operating range |

Actions are also defined (or adopted from an already existing action library) (step 106). As explained above, an action comprises one or more measures, in particular the activation of an actuator and/or the sending of a message to other components. The actions are assigned to the individual entities. If actions which relate to a plurality of entities (in particular in different classes) have been defined, actions can also be assigned to specific combinations of entities (connected to one another).

It is then determined which information must be provided in order to be able to actually perform the regulation (step 107). The variables to be measured and the calculable variables are defined therefrom.

On the basis of this, it is therefore then identified which measurement variables can be used for regulation (step 108). Regulation processes ultimately comprise the determination of one or more measurement variables, the processing for the purpose of determining the action(s) to be taken and the performance of the action until the regulation variable is influenced. A certain information transmission time results depending on the complexity of the regulation process, the distribution of the components involved in the grid and the time requirement for processing the measurement variables. This information transmission time is determined and is compared with a maximum permitted information transmission time (step 109). The latter need not be the same for all regulation processes because certain regulation operations must take place more quickly than others if the operation of the grid is not intended to be negatively influenced.

In a similar manner to the measurement variables, it is also possible to stipulate the extent to which the selection and the topology of the grid components can be changed. For example, optimization limited to the dynamic variables can be carried out, or the possible changes to the infrastructure can be restricted to the addition of particular actuators and sensors.

The physically smallest possible information latencies optionally determined (step 110). This makes it possible to immediately eliminate particular scenarios which are not compatible with the required latencies, for example the real-time control of a smart grid by means of smart meters if "real time" is in the seconds range or if data are transmitted only once a day (for example from the household meter) and "real time" means a maximum of 10 minutes.

On the basis of the starting topology with the entities in the different classes and the associated desired ranges, the variables to be regulated and the available measurement variables and actions, the grid is then numerically optimized taking into account the permissible transmission times (step 111). As stated above, various approaches known per se can be pursued for this purpose, even in combination. In particular. (non-linear) numerical optimization of a target function is carried out, in which the relevant criteria are included. Limits to be observed in any case can be included in the target function as secondary conditions, for example by means of Lagrange multipliers. The criteria are generally both of a technical and of an economic nature.

The optimization can be carried out with regard to the broadest possible decentralization of the grid since it can be expected that the operational safety (namely the robustness with respect to local faults) is maximized in such a case. A combination of a plurality of entities (even entities which typically cannot be locally regulated), including associated actions (and trigger criteria), in local functional groups therefore follows from the optimization.

As mentioned above, the addition of further components to the existing infrastructure can also be directly checked as part of the numerical optimization. If, in contrast, optimization with regard to the dynamic variables is first of all carried out, it is possible to check, if a rule is violated, on the basis of the stipulated actions whether the necessary infrastructure, in particular sensors and actuators, is already available. Alternatively, after stipulating the desired operation, it is possible to advisorily check which actions are possible or to automatically calculate which functional groups are physically possible and—if a technology or a product is stored with characteristic values (for example based on a GIS)—which actions are required. If the technology or product information is not immediately available, the comparison is advisorily carried out, in which case hypotheses can be checked for their feasibility with the aid of the method according to the invention.

In one application, the steps presented are carried out as follows, for example. Step 101 stipulates that all consumers on grid level 1.7, that is to say in the low-voltage grid, are intended to be considered. In principle, the power resulting from voltage and maximum currents and the frequency can be regulated here as dynamic variables according to step 102.

Within the scope of the exemplary application, the energy requirement on grid level 1.7 is intended to be limited by regulating phase currents and voltages while complying with the European standard EN 50160. This may be useful, for example, if peak load times cause high costs because energy must be purchased at unfavorable prices or if materials such as cables reach their operational limits and there is a risk of property and personal damage or grid failures. In step 104, the consumers are classified according to minimum and maximum currents and voltages, for instance in private households having operating voltages of 230 V and maximum currents of 100 A and businesses having operating voltages of 400 V and higher maximum currents. Step 105 defines the desired operation, in this case while complying with EN 50160 and restricting the maximum power. In a simple variant of the method, all consumers are restricted to the same extent, for instance to 80% of the maximum current. In an extended variant, the voltage can be taken into account. In a further variant, the power can be limited based on a connection string of a transformer station and the maximum power of the connected consumers can be adapted based on the total power.

Actions are now defined according to step 106. These actions comprise, in particular, the limitation of the current if the maximum current stipulated according to step 105 is exceeded.

Step 107 stipulates the information needed to implement the regulation task. In the simple variant, this information is the currents of the home connections, in the extended variant, it is also the voltages and, in the variant of the string-based power limitation, it is the calculated sum of the instantaneous string power. It is accordingly identified which measurement variables can be used and whether additional measuring points are required or would be advantageous (step 108).

Step 109 comprises the determination of the maximum permitted time for transmitting information for each regulation process. In the present case, this could be selected in the seconds or else minutes range depending on the infrastructure and costs. The stipulation of the physically possible information latency according to step 110 can be disregarded In the present case. This step would be necessary in a conventional architecture in which regulation processes should be carried out for such limitations on the basis of a central control center—locally optimized power limitation would not be possible or would be possible only with considerable outlay depending on the solution.

Step 111 comprises the optimization of the existing grid according to the above steps. Numerical optimization is possible but is not compulsory in the present case. A comparison with a grid topology or a measuring infrastructure can take place manually or in an automated manner here. If appropriate, following a cost analysis, smart meters with appropriate measuring capabilities and/or actuators for power limitation are then retrofitted or grid reinforcements are carried out. The resulting orders and installation orders can be effected using an automated logistics interface.

In order to structure a grid for distributing electric energy with respect to the dynamic variables in the grid, the following procedure is used in a specific case, for example:

1. The entire grid which is operated by a grid operator is first determined as the grid section to be structured.
2. The following results for the energy in this grid:

$$E_{electric\,grid} = E_{Consumption} + E_{Production} + E_{Transmission} + E_{Transformation} + E_{Import} + E_{Export} \text{ where } E = P*t; P = U*I \text{ etc.}$$

The available electric energy from renewable energy sources can be regulated by being limited to a maximum. This maximum can also be dynamically or locally optimized or both.
3. Individual energy values readily result from the power values:

$$E_n = P_n * t$$

4. And therefore also the regulation limits:

$$E_{n,min}^{max} = P_{n,min}^{max} * t$$

5. If these limits are exceeded or undershot, there is a need for action:

$$E_n(t) < E_n^{min}: \text{fault message}$$

$$E_n(t) > E_n^{max}: \text{curtailment}$$

6. This results in requirements imposed on the individual power, voltage and current values $P_n(t)$, $U_n(t)$, $I_n(t)$.
7. For $P_n$, (A, ρ, I, t), the time to the earliest possible occurrence of a cable fire or a device fault results as the maximum time before the effect of a regulation process; for $P_{min}$, the intention is to comply with a maximum tolerated time for fault messages.
8. The required information transmission time is calculated as follows:

$$t_{min} = t_{Measurement} + t_{AD/conversion} + 2*t_{Transmission} + t_{Algorithm} + t_{Actuator}$$

Based on this information, the various possible solutions are then assessed in order to find out, for example, whether it is more useful to carry out the regulation by means of a microprocessor and an actuator on the component itself or whether regulation in a transformer station is more expedient. In addition to technical criteria (for example with respect to the operational safety of the grid), economic criteria (for example with respect to conversion and operating costs) also play a role in this assessment.

Figure 3:
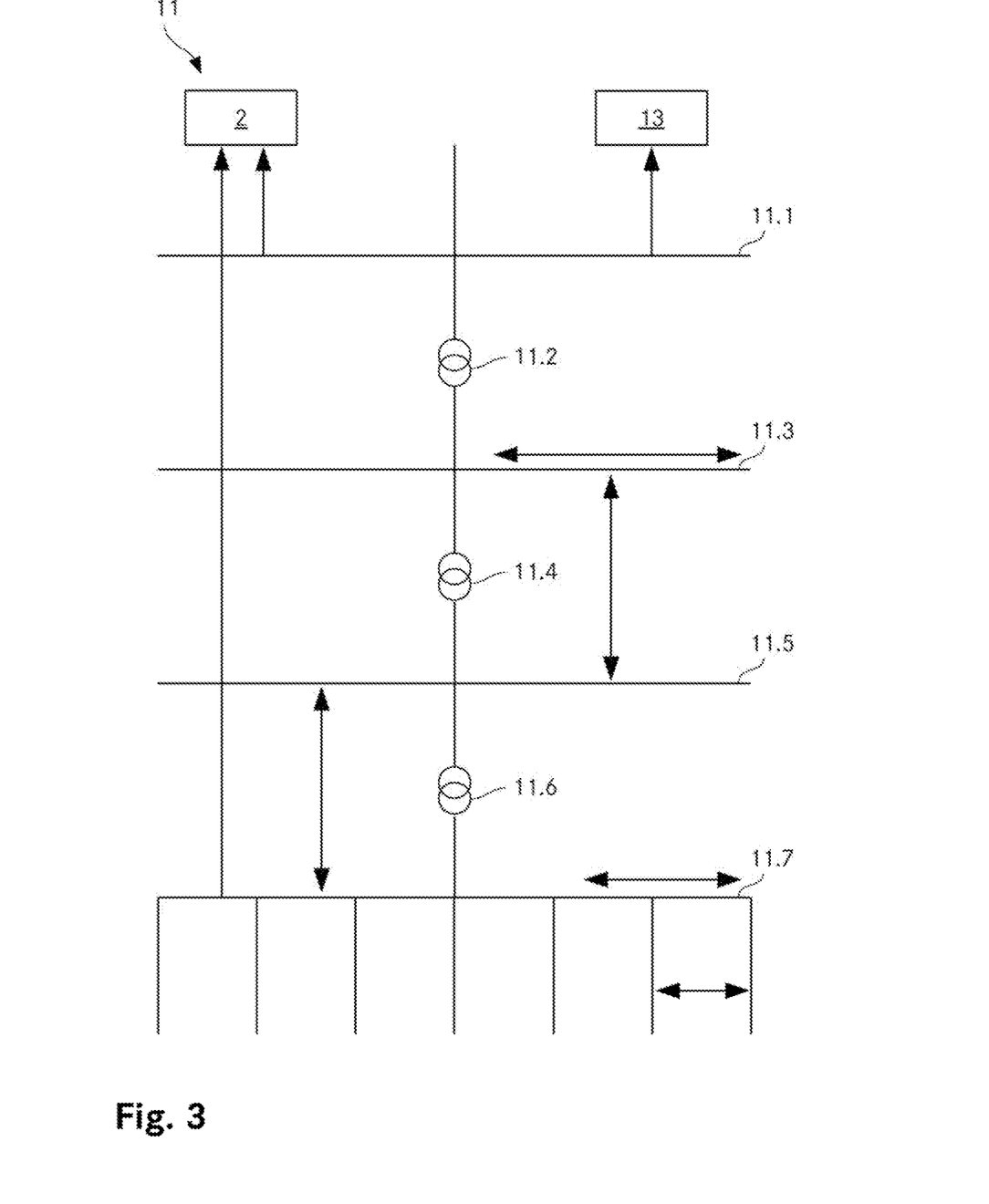
FIG. 3 a schematic illustration of a distribution grid structured using the method according to the invention with local regulation.

A grid structured according to the method consists of a multiplicity of self-operating, preferably also self-optimizing and self-maintaining, functional groups. The grid may partially or completely consist of such functional groups. Such a grid 11 is schematically illustrated in FIG. 3. It is still subdivided into the known grid levels 11.1 . . . 1.7 which correspond to the grid levels 1.1 . . . 1.7 in FIG. 1. The control center 2 is still present but is required only as an exception, in cases which cannot be regulated using the method presented. In addition to the control center 2, fault management 13 is provided and is used when an event cannot be resolved in a local functional group or on a lower grid level.

Information is transmitted as a priority between the transmission or distribution grid levels 11.1, 11.3, 11.5, 11.7 between local functional groups. Transmission takes place secondarily between the transmission or distribution grid levels 11.1, 11.3, 11.5, 11.7 or, if necessary, over a plurality of grid levels 11.1 . . . 11.7, to the central control center 2.

Figure 4:
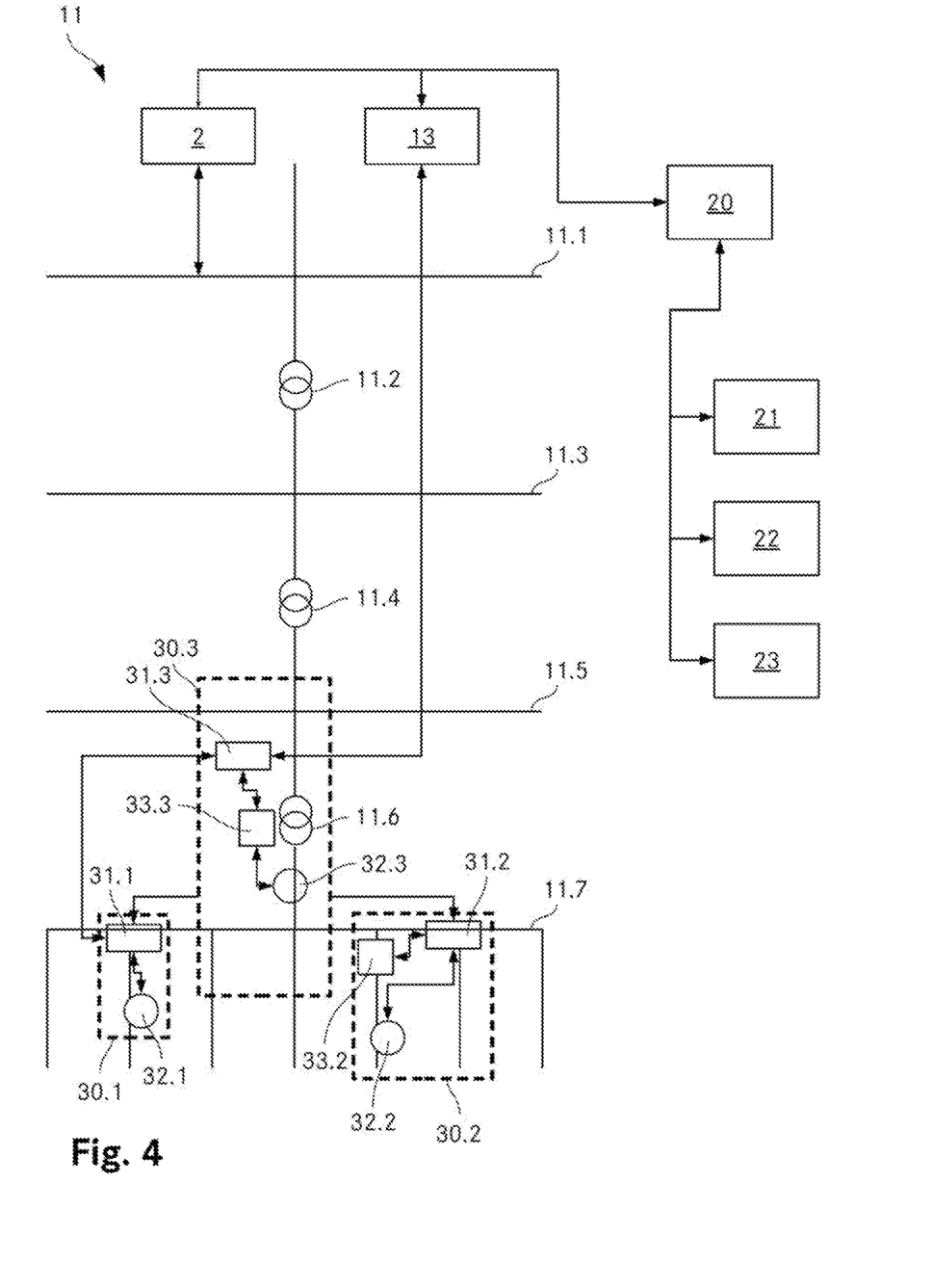
FIG. 4 a block diagram of a system for carrying out a method according to the invention for operating a distribution grid for electric energy.

FIG. 4 shows a block diagram of a system which can be used to carry out the method according to the invention for operating a grid for electric energy. The grid 11 is constructed according to the illustration in FIG. 3. The system comprises a central computer unit 20 on which the method according to the invention for operating the grid 11 runs. The computer unit 20 is connected to a grid-based geographical information system (GIS) 21. The latter comprises a database which stores, inter alia, the present topology of the grid and the components known to the grid operator with their relevant properties. The computer unit 20 is also connected to a logistics interface 22 which can be used to automatically request additional grid components or replacement parts. The computer unit 20 is also connected to a maintenance interface 23 which can be used to request maintenance services for maintenance, fault correction or repair.

The computer unit also communicates with the control center 2 and the fault management 13.

A plurality of local functional groups are defined in the individual grid levels or in a cross-grid-level manner. FIG. 4 illustrates, by way of example, three such functional groups 30.1, 30.2, 30.3. Two of the functional groups 30.1, 30.2 are arranged in the grid level 11.7 and a further functional group extends over the grid levels 11.5-11.7 and comprises, inter alia, a converter 11.6.

Each of the functional groups 30.1 . . . 3 comprises a control unit 31.1, 31.2, 31.3 (symbolized by a rectangle). At least one sensor unit 32.1, 32.2, 32.3 (symbolized by a circle) is likewise present in each of the illustrated functional groups 30.1 . . . 3, which sensor unit measures one or more relevant variables and transmits them to the corresponding control unit 31.1 . . . 3. At least one actuator 33.2, 33.3 (symbolized by a square) is also present in two of the three functional groups 30.2, 30.3 shown, which actuator can be used to influence the method of operation of the respective functional group 30.2, 30.3 in a manner triggered by the respective control unit 31.2, 31.3.

The control units 31.1, 31.2 of the two local functional groups 30.1, 30.2 are connected to one another in the grid level 11.7 and can interchange information when corresponding actions are triggered. The control unit 31.1 of the local functional group 30.1 is also connected to the control unit 31.3 of the cross-grid-level local functional group 30.3. The latter can in turn interchange data with the fault management 13.

The connections illustrated should be understood as examples. The illustration does not mean that (direct) physical connections must exist between the components mentioned, and data can be interchanged, for example, via a bus system or a central router. In the end, it is relevant which actions are assigned to the individual functional groups 30.1 . . . 3. Unidirectional or bidirectional data interchange with further functional groups or components can be enabled by adding an additional action.

The method according to the invention for structuring the grid can be applied to a number of problems, for example can be used to prioritize the consumption of locally available energy, for example energy produced by photovoltaic installations. This makes it possible to reduce the transport route of the energy. The dynamic response expected in the grid with respect to the power to be transmitted is thereby reduced and the design of the grid can accordingly likewise satisfy reduced requirements.

In a further application, it is possible to define a minimum schedule for power plants on grid level 1 and rules for infringements of the desired operation (frequency or production volume not achieved etc.). In the situations which cannot be regulated by means of local actuators, an item of information is transmitted to an external system (control center, fault management). Information for operation may correspond to measured rule violations from other functional groups, in which case the action of the measuring functional group, which is carried out upon reaching a corresponding trigger criterion (for example a frequency disturbance), provides for information to be sent to the receiving functional group (for example on grid level 1).

In summary, it can be stated that the invention provides a method for structuring an existing grid for distributing electric energy, which method can be systematically applied to the existing grid and enables a high degree of operational safety with a low susceptibility to faults.

The invention claimed is:

1. A method for structuring an existing grid for distributing electric energy, wherein the grid comprises, as grid components, at least sources, loads, lines, sensor, switching and converter components which are connected to one another in a starting topology, wherein, on the basis of property variables of the grid components and predefinable regulation limits,
   a) the grid components are combined in a plurality of local, self-regulating functional groups, and
   b) each local functional group is assigned regulation processes comprising actions which are carried out upon reaching trigger criteria for complying with the regulation limits, the actions comprising local actions, which influence operation of the components in the respective local functional group, and non-local actions, which comprise a transmission of data to another local functional group or to a cross-functional-group control center, and
   wherein for operating the structured grid sensor components in the local functional groups are used to monitor whether trigger criteria for the actions assigned to the respective local functional group are reached, and wherein one of the actions assigned to the respective functional group for complying with the regulation limits is carried out upon reaching a trigger criterion.

2. The method as claimed in claim 1, comprising a definition of a potential local functional group and a check in order to determine whether the potential local functional group can be locally regulated while complying with the predefinable regulation limits, wherein the potential local functional group is accepted if local regulability is determined, and wherein the potential local functional group is expanded with further grid components if local regulability is absent.

3. The method as claimed in claim 1, wherein a need for additional grid components for creating additional local functional groups and/or for ensuring the predefinable regulation limits is determined.

4. The method as claimed in claim 3, wherein the target function is dependent on costs of the additional grid components, and in that the numerical optimization favors minimization of these costs.

5. The method as claimed in claim 1, wherein a target topology is determined on the basis of the starting topology.

6. The method as claimed in claim 5, wherein the target function is dependent on costs of an adaptation between a starting topology and a target topology, and in that the numerical optimization favors minimization of these costs.

7. The method as claimed in claim 1, the predefinable regulation limits comprising maximum latencies for transmitting data between local functional groups and/or different grid components.

8. The method as claimed in claim 1, comprising numerical optimization of a target function for combining the grid components in the local functional groups.

9. The method as claimed in claim 8, wherein the target function is dependent on a volume of data transmitted between grid components for regulating the grid, and in that the numerical optimization favors minimization of this volume of data.

10. The method as claimed in claim 9, wherein the target function is dependent on costs of the additional grid components, and in that the numerical optimization favors minimization of these costs.

11. The method as claimed in claim 9, wherein the target function is dependent on costs of an adaptation between a starting topology and a target topology, and in that the numerical optimization favors minimization of these costs.

12. The method as claimed in claim 1, wherein local prices for the local functional groups are determined, in that the target function is dependent on the local prices, and in that the numerical optimization favors minimization of these costs.

13. The method as claimed in claim 1, the existing grid comprising at least components in two adjacent levels of the following grid levels:
 a) extra-high voltage grid with a voltage of 380 or 220 kV:
 b) high-voltage grid with a voltage of 36-150 kV;
 c) medium-voltage grid with a voltage of 1-36 kV; and
 d) low-voltage grid with a voltage of 400 V-1 kV.

14. The method as claimed in claim 1, wherein the property variables of the grid components and/or the starting topology is/are received from a geographical information system.

15. The method as claimed in claim 14, wherein a maintenance requirement is detected and maintenance services are automatically requested.

16. The method as claimed in claim 15, wherein automatic ordering processes are initiated via a logistics interface.

17. A computer program for carrying out the method as claimed in claim 1.

* * * * *